United States Patent
Raut

(10) Patent No.: US 7,200,731 B2
(45) Date of Patent: Apr. 3, 2007

(54) MEMORY LEAK DETECTION

(75) Inventor: Devendra Raut, Cupertino, CA (US)

(73) Assignee: Alcatel IP Networks, Inc., Plano, TX (US)

( * ) Notice: Subject to any disclaimer, the term of this patent is extended or adjusted under 35 U.S.C. 154(b) by 320 days.

(21) Appl. No.: 10/831,457

(22) Filed: Apr. 23, 2004

(65) Prior Publication Data
US 2005/0240747 A1 Oct. 27, 2005

(51) Int. Cl.
G06F 12/00 (2006.01)

(52) U.S. Cl. ......................... 711/170; 717/128
(58) Field of Classification Search .................. 711/170
See application file for complete search history.

(56) References Cited

U.S. PATENT DOCUMENTS

| | | | |
|---|---|---|---|
| 5,842,019 A * | 11/1998 | Kolawa et al. ............. | 717/130 |
| 6,658,652 B1 * | 12/2003 | Alexander et al. .......... | 717/128 |
| 2004/0123038 A1 * | 6/2004 | Shami et al. ................ | 711/132 |
| 2005/0076184 A1 * | 4/2005 | Schumacher ................ | 711/170 |
| 2005/0204342 A1 * | 9/2005 | Broussard .................... | 717/124 |

* cited by examiner

Primary Examiner—Brian R. Peugh
Assistant Examiner—Hashem Farrokh
(74) Attorney, Agent, or Firm—Van Pelt, Yi & James LLP

(57) ABSTRACT

A technique is disclosed for detecting a memory leak. A request to allocate or deallocate memory is received. In a memory leak table that is bounded in size, an entry that is associated with a call path with which the request is associated is accessed. The entry in the memory leak table is updated. The entry is accessed and a value stored in the entry is read. It is determined if the value indicates that a memory leak may be present.

37 Claims, 9 Drawing Sheets

MEMORY LEAK DETECTION

FIELD OF THE INVENTION

The present invention relates generally to computer environments. More specifically, memory leak detection is disclosed.

BACKGROUND OF THE INVENTION

Memory leaks can occur when a program allocates memory but does not later deallocate the memory. Typical conventional memory leak detection systems sample a processor running the program at some rate, such as 100 samples per second. When a memory allocation is detected in a sample, a memory allocation record is stored. When a memory deallocation is detected, a corresponding memory allocation record is deleted. Memory allocation records can be analyzed for memory leaks. One problem with this method is it can consume an increasing amount of runtime memory. Another problem with this method is the sampling may miss some call paths. Also, a special build is typically required for the process. It would be desirable to have a more reliable and efficient way to perform memory leak detection.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a memory leak is disclosed. A memory leak table may be used to detect a memory leak. When a memory allocation or deallocation request is received, an entry associated with a call path is updated in the memory leak table. In one embodiment, there is an entry for each unique call path. In one embodiment, the memory leak table is bounded in size by using a hash function to map a call path to a table entry. A memory leak can be detected by analyzing the memory leak table entries during or after program execution.

Figure 1A:
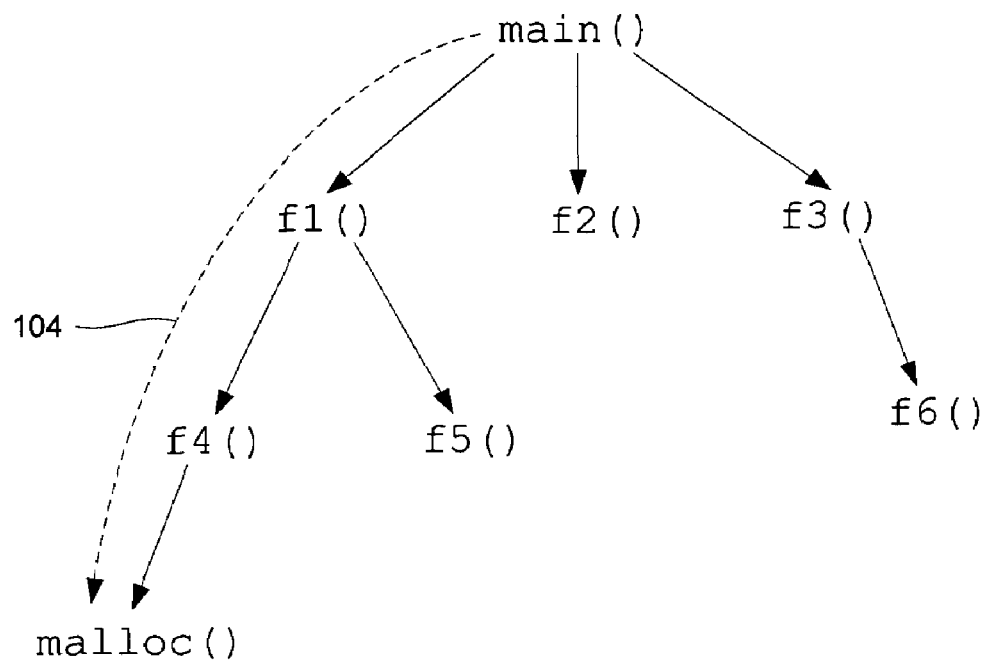
FIG. 1A is a diagram illustrating a call path that results in a memory allocation.

FIG. 1A is a diagram illustrating a call path that results in a memory allocation. In this example, a series of nested function calls (a function that calls a function that calls a function, etc.) results in a call to a memory allocation function, "malloc". As used herein, the call path of a memory request refers to the sequence of function calls that resulted in the memory request. In the example shown in FIG. 1A, a program main calls a function f1, which calls a function f4, which calls malloc, a memory allocation function. The call path 104 for this memory allocation includes: main, f1, f4, and malloc. These function calls are stored in a stack during runtime.

Figure 1B:
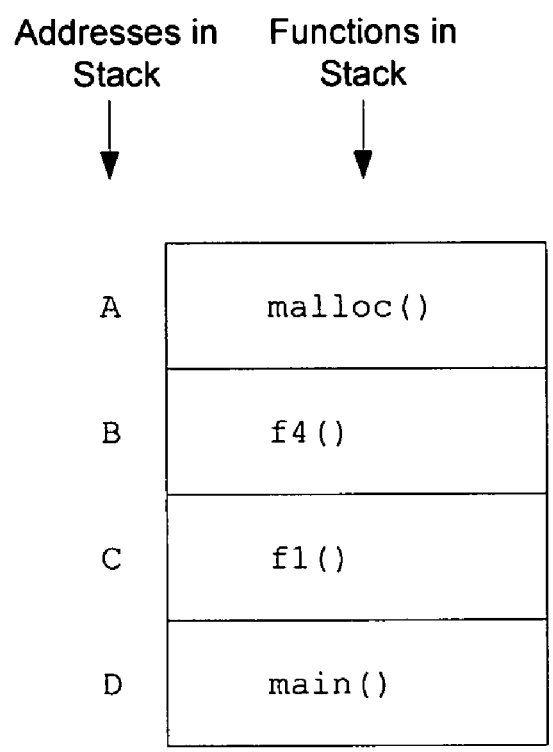
FIG. 1B is a diagram illustrating a stack associated with a call path that results in a memory allocation.

FIG. 1B is a diagram illustrating a stack associated with a call path that results in a memory allocation. In this example, stack 108 is shown for call path 104. A stack refers to a memory in which a program stores data, such as function calls, passed parameters, and local variables during processing. As shown, the stack follows a last in, first out method of access; that is, function calls are stored in the reverse order in which they were called. A, B, C, and D are the addresses in the stack where the functions malloc, f4, f1, and main, respectively, are stored.

Figure 2A:
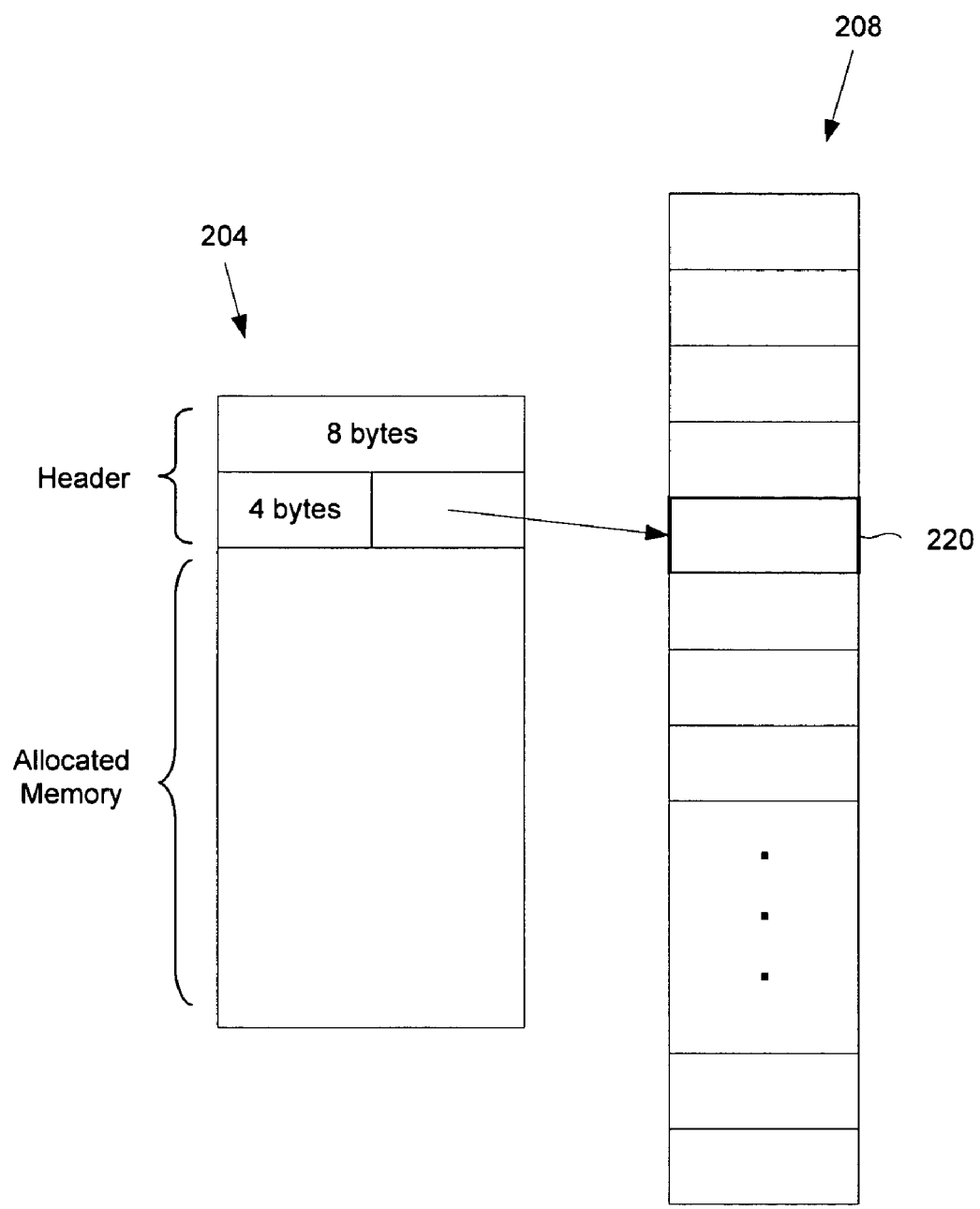
FIG. 2A is a diagram illustrating an allocated memory block and a memory leak table used in some embodiments.

FIG. 2A is a diagram illustrating an allocated memory block and a memory leak table used in some embodiments. In this example, allocated memory block 204 is a block of memory resulting from a call to a memory allocation function, such as malloc. In one embodiment, memory block 204 is eight byte aligned. Memory block 204 is shown to include a header and an allocated memory. The allocated memory is the portion that can be used by the program under execution. The header includes header information and a pointer to entry 220 in memory leak table 208. In one embodiment, the pointer to entry 220 is stored in bytes that are normally unused by the header. Memory leak table 208 is bounded in size. That is, the size of memory leak table 208 does not increase without bound during program execution. In one embodiment, memory leak table 208 includes 1024 rows. In some embodiments, memory leak table 208 is bounded in size by storing entries in a location associated with a value determined by calculating a hash result based, e.g., on the stack pointers associated with the call path and calculating the modulo N of the hash result, where N is the number of rows in the memory leak table 208. Each entry in memory leak table 208 is associated with a call path.

Figure 2B:
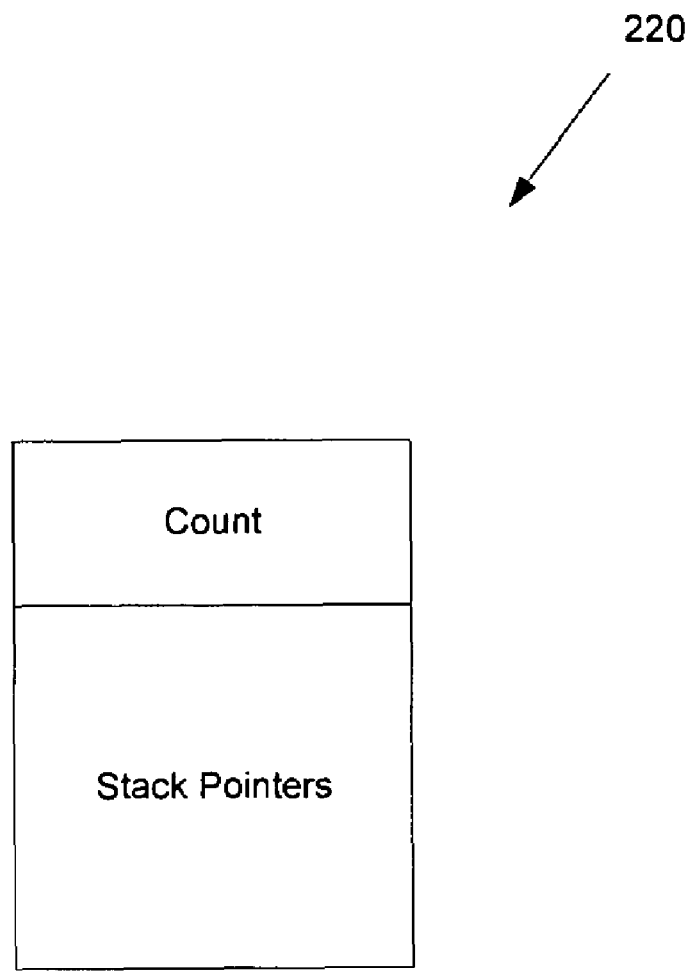
FIG. 2B is a diagram illustrating an entry used in one embodiment in a memory leak table.

In one embodiment, entry 220 is unique to the call path from which memory block 204 was allocated. Each time this call path is called and a new memory block is allocated, entry 220 is updated. Entry 220 includes information that tracks memory requests resulting from that call path. Such information can be stored in numerous ways. FIG. 2B is a diagram illustrating an entry used in one embodiment in a memory leak table. In this example, entry 220 is shown to include a first region in which a count is stored and a second region in which stack pointers are stored. The count is incremented when memory is allocated by a call path associated with entry 220 and decremented when memory is deallocated by a call path associated with entry 220. In one embodiment, an entry that has a nonzero count value after a program finishes executing may indicate a memory leak. In one embodiment, an entry that has a count value greater than a prescribed threshold other than zero may indicate a memory leak.

The stack pointers included in entry 220 in some embodiments comprise addresses in the stack of function calls in the call path associated with entry 220. For example, referring back to FIGS. 1A–1B, the stack pointers for call path 104 would be A, B, C, and D. The number of stack pointers stored in entry 220 can be limited to a certain number. In one embodiment, up to 16 stack pointers are stored in entry 220. In another embodiment, up to 30 stack pointers are stored. The stack pointers may be stored in any other appropriate way. The number of call path stack pointers stored may vary and in general the number of stack pointers stored should be sufficiently large to ensure that in general a unique entry will be made for every unique call path that includes a memory allocation or deallocation. For example, call paths may exceed 16 functions but storing the 16 functions at the top of the stack may be sufficient to ensure a unique entry exists for each call path that allocates or deallocates memory.

Figure 2C:
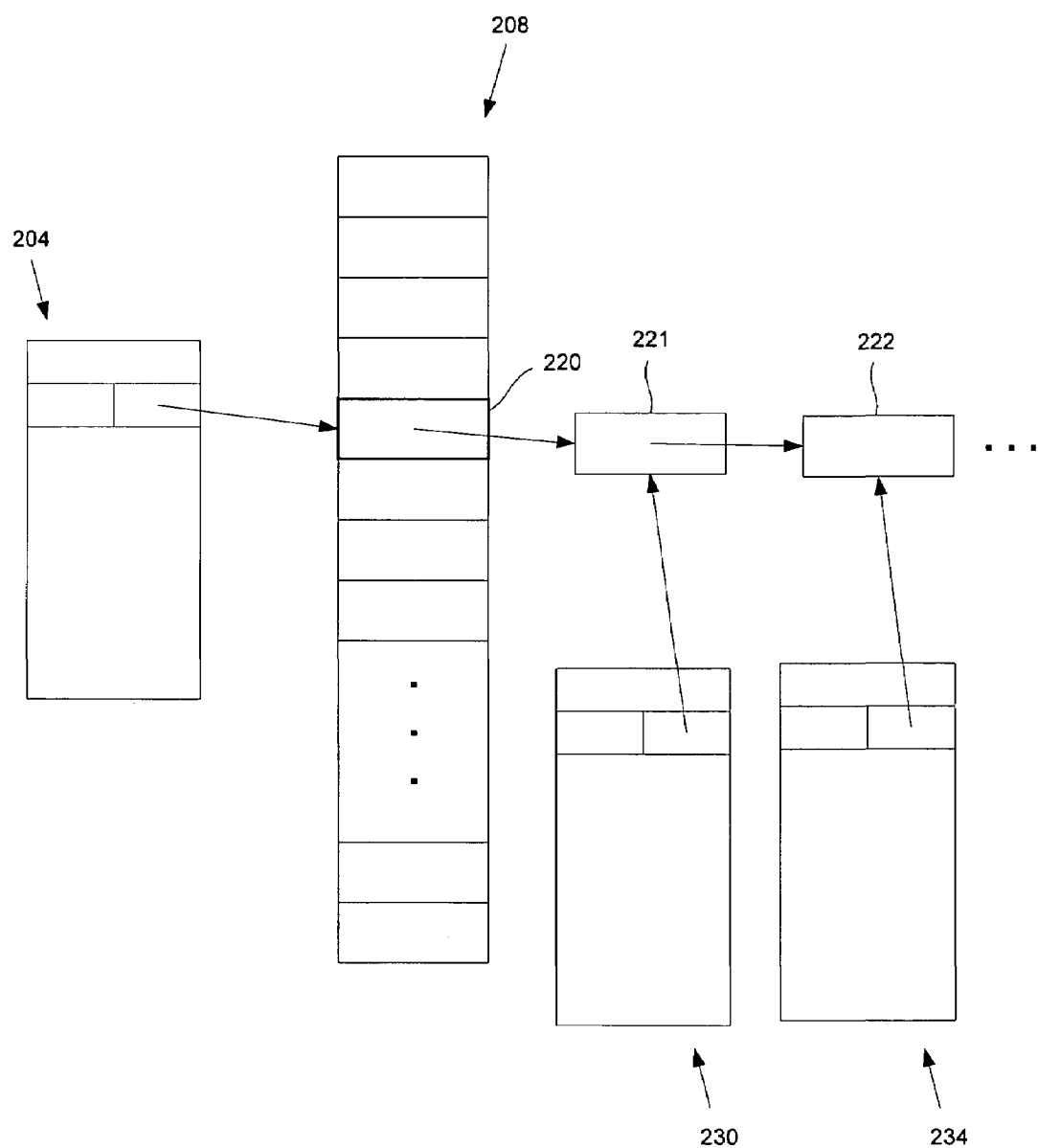
FIG. 2C is a diagram illustrating a linked list used in some embodiments in a memory leak table.

In some embodiments, there is an entry in memory leak table 208 for each unique call path. Bounding the size of memory leak table 208 may result in multiple entries mapping to the same row in memory leak table 208 in some embodiments. For example, a hash function may be performed on call path parameters, and the hash result may be used to determine a row in memory leak table 208. To bound the size of the table, in some embodiments the modulo base N of the hash result may be taken, for example, where N is the number of rows in the memory leak table. In such an embodiment, even if each call path associated with a memory allocation or deallocation were to yield a unique hash result, the result of the modulo base N of the respective hash results for two unique call paths may be the same. In such embodiments, a provision must be made for storing in a single row of the memory leak table a separate entry such as entry 220 for each of two or more unique call paths. In some embodiments this is achieved by configured each row of the memory leak table to store a linked list of entries, each entry being associated with a unique call path. FIG. 2C is a diagram illustrating a linked list used in some embodiments in a memory leak table. In this example, memory leak table 208 includes entries 220, 221, and 222 in a linked list. Memory blocks 204, 230, and 234 each resulted from unique call paths, but each maps to the same row in memory leak table 208. For example, the hash function of the stack pointers associated with each of memory blocks 204, 230, and 234, modulo N, may result in the same value. To maintain separate entries for each of memory blocks 204, 230, and 234, the entries are inserted into a linked list as shown. Each separate entry in the linked list may be identified by a key associated with the call path with which the entry is associated, e.g., a hash value based on the call path. The linked list may be of any length.

Figure 3A:
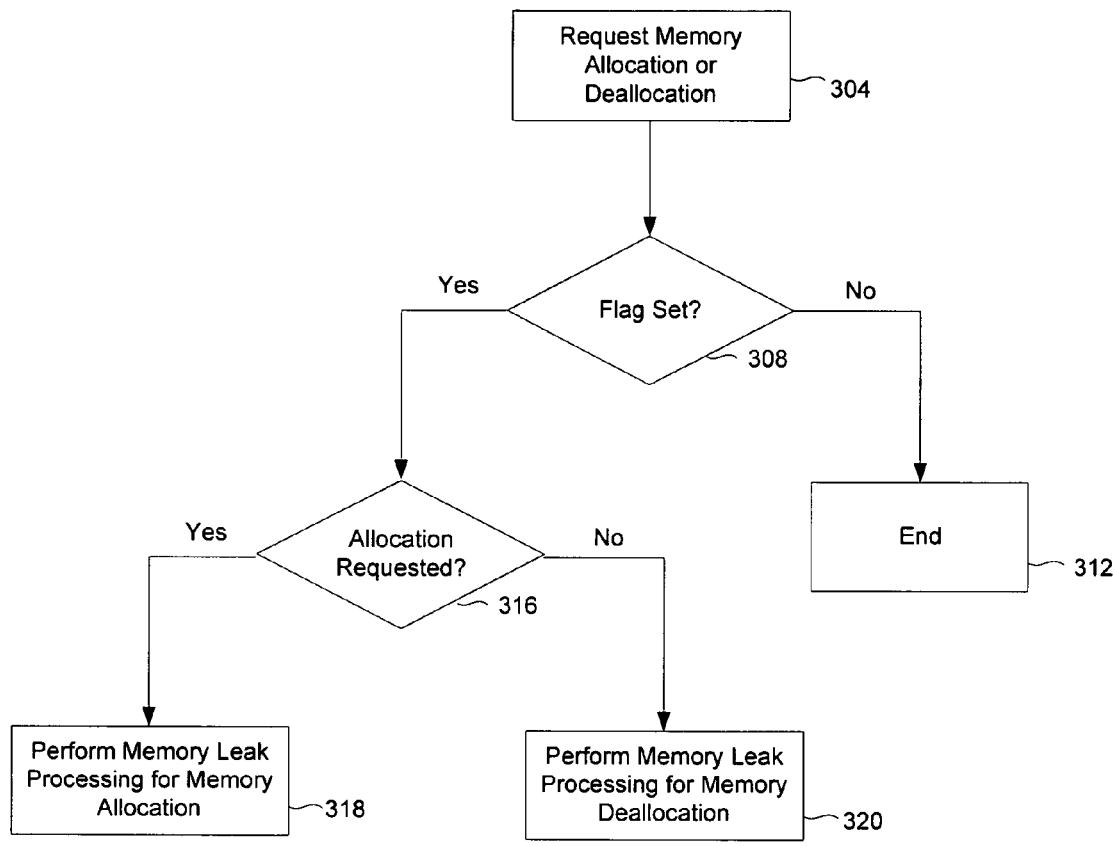
FIG. 3A is a flowchart illustrating a method used in one embodiment to handle a memory allocation or deallocation request for memory leak detection.

FIG. 3A is a flowchart illustrating a method used in one embodiment to handle a memory allocation or deallocation request for memory leak detection. In one embodiment, a memory manager performs one or more steps of this process. A request for a memory allocation or deallocation is received (304). For example, a memory allocation function, such as "malloc", may be called. A memory deallocation function, such as "free", may be called. It is determined whether a flag is set (308). A set flag indicates that memory leak detection is enabled. In one embodiment, the flag is included in the memory allocation and memory deallocation functions. In one embodiment, the flag is associated with the memory manager and, if set to a value indicating that memory leak detection should be performed, additional code is included in the memory allocation and deallocation functions (e.g., malloc and free, respectively) to cause memory leak detection processing to be performed as described herein. If the flag is not set, memory leak detection is disabled, and the process of FIG. 3A ends and the memory allocation or deallocation is processed without memory leak detection processing being performed (312). If the flag is set, memory leak detection is enabled and it is determined whether the memory-related function being processed is an allocation or a deallocation (316). If memory allocation is requested, memory leak processing for memory allocation is performed (318). If memory deallocation is requested, memory leak processing for memory deallocation is performed (320).

Figure 3B:
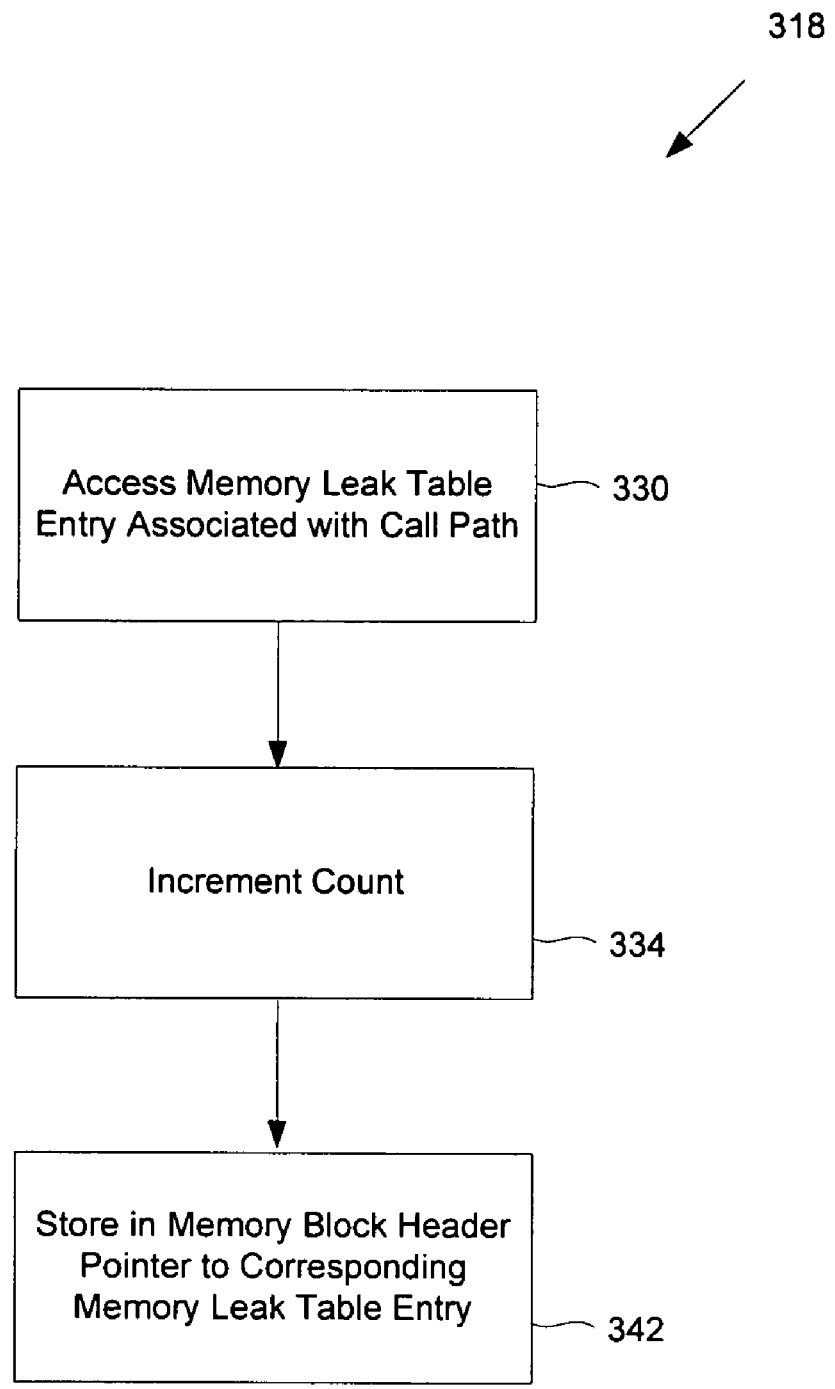
FIG. 3B is a flowchart illustrating a process used in one embodiment to perform memory leak processing for memory allocation.

FIG. 3B is a flowchart illustrating a process used in one embodiment to perform memory leak processing for memory allocation. In one embodiment, this process is used to perform step 318 of FIG. 3A. A memory leak table entry associated with the call path of the memory request is accessed (330). In one embodiment, the memory leak table is memory leak table 208 and the entry is an entry such as entry 220. A count in the entry is incremented (334). The count keeps track of the number of times a block of memory has been allocated or deallocated via the call path. Alternatively, memory allocated from the call path may be tracked in another way and the entry updated as appropriate. A pointer to the entry in the memory leak detection table is stored in the memory block header allocated as a result of the request (342). This enables direct inspection of an allocated block of memory to determine the functions that allocated it.

Figure 3C:
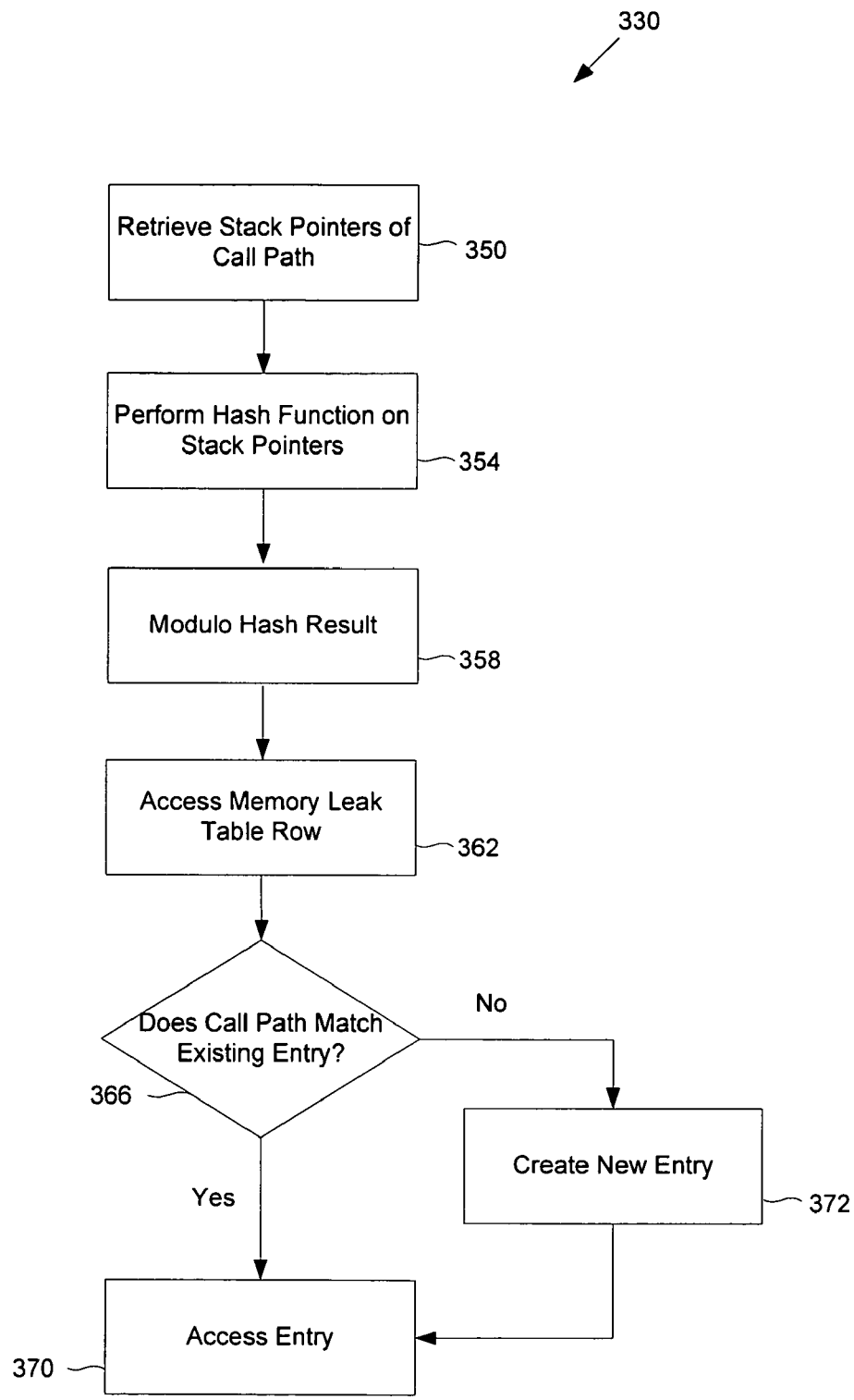
FIG. 3C is a flowchart illustrating a process used in one embodiment to access a memory leak table entry when memory is allocated.

FIG. 3C is a flowchart illustrating a process used in one embodiment to access a memory leak table entry when memory is allocated. In one embodiment, this process is used to perform step 330 of FIG. 3B. First, the stack pointers of the call path (or, in some embodiments, a prescribed number of the pointers in the stack) are retrieved (350). A hash function is performed on the stack pointers (354). The hash function may be performed on all the stack pointers or on a subset of the stack pointers. In one embodiment, the most recent 16 stack pointers are used to perform the hash function. In one embodiment, the hash function is an XOR function. A modulo of the hash value is taken (358) to produce a table index. In one embodiment, the modulo base is the size of the memory leak table. In one embodiment, the hash function includes the modulo function. A row in the memory leak table is accessed based on the table index (362). For example, the table index may be the row number in the memory leak table. Because every call path is mapped to a value bounded by the modulo operation, the size of the memory leak table is bounded. The table may be bounded in other ways. For example, steps 354 and 358 may be replaced by another method for mapping every call path to a table index.

Once a row in the memory leak table is accessed, it is determined whether the call path matches that of an existing entry (366). For example, zero, one or multiple entries may be associated with the row. In one embodiment, the hash value calculated in step 354 is used as a key to determine if there is an existing entry in the row that is associated with the call path. In one embodiment, multiple entries form a linked list that is associated with the row, as shown in FIG. 2C. Each entry includes a count and stack pointers associated with a call path, as shown in FIG. 2B. The linked list is searched for an entry with the same call path or, in some embodiments, a key associated with the call path, such as the hash value calculated in step 354. If an entry matching the call path is found, that entry is accessed (370). If an entry matching the call path is not found or if there are no entries in the row, a new entry is created (372). In one embodiment, the new entry is inserted at an appropriate place in a linked list associated with the row. In one embodiment, the entry includes a count and a stack pointer as described in connection with FIG. 2B.

Figure 3D:
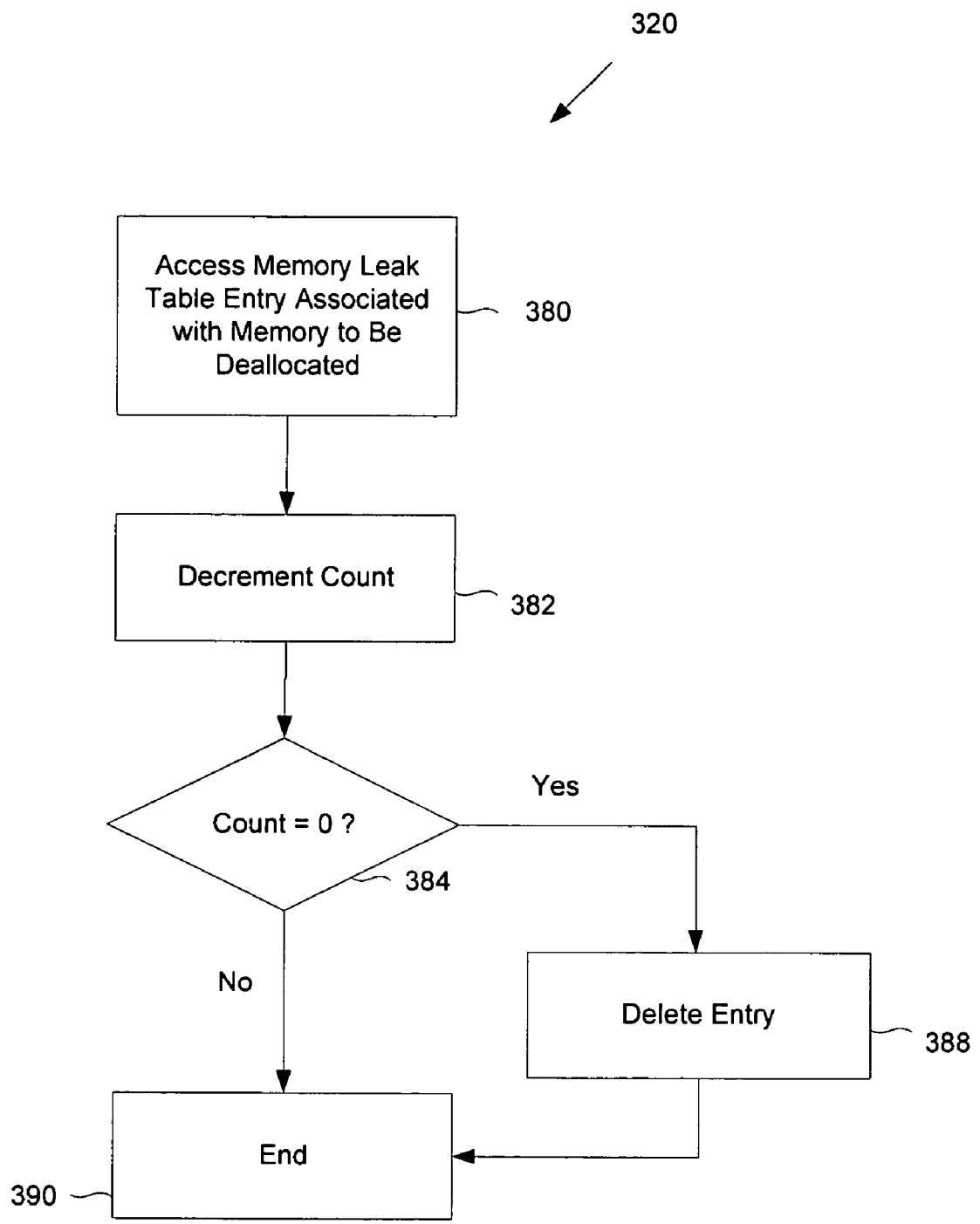
FIG. 3D is a flowchart illustrating a process used in one embodiment to perform memory leak processing for memory deallocation.

FIG. 3D is a flowchart illustrating a process used in one embodiment to perform memory leak processing for memory deallocation. In one embodiment, this process is used to perform step 320 of FIG. 3A. The memory leak table entry associated with the memory block to be deallocated is accessed (380). In one embodiment, the memory block to be deallocated is memory block 204 and the memory leak table entry is an entry such as entry 220. In one embodiment, the memory block includes in its header a pointer to the memory leak table entry. The memory block header can thus be inspected for a pointer to the memory leak table entry. A count in the entry is decremented (382). Alternatively, memory deallocation may be tracked in another way and the entry updated as appropriate. Optionally, it is determined whether the count as decremented equals zero (384). If the count equals zero, the entry may optionally be deleted (388). If not, the entry remains (390).

As such, a memory leak table can be used to detect one or more memory leaks in an application. For example, entries in the memory leak table can be analyzed. In one embodiment, any entries that have nonzero count values after a program is finished executing may indicate a memory leak. By storing stack pointers in the entries of the memory leak table, the call paths can be analyzed to determine the source of memory leaks in the program. Allocated memory blocks can also be analyzed. By storing in each memory block header a pointer to an entry in the memory leak table, the functions that allocated the memory block can be determined. This may be useful for analyzing whether a process is allocating more memory than expected.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting a memory leak, comprising:
   receiving a request to allocate or deallocate memory;
   accessing in a memory leak table that is bounded in size an entry that is associated with a call path with which the request is associated;
   updating the entry in the memory leak table;
   accessing the entry and reading a value stored in the entry; and
   determining if the value indicates that a memory leak may be present.

2. The method of claim 1, wherein if the request is one to allocate memory the call path with which the request is associated is the call path by which the request was generated.

3. The method of claim 1, wherein if the request is one to deallocate memory the call path with which the request is associated is the call path by which the memory to be deallocated was allocated.

4. The method of claim 1, wherein the entry is unique to the call path.

5. The method of claim 1, wherein receiving a request to allocate or deallocate memory comprises receiving a call to a memory allocation function "malloc".

6. The method of claim 1, wherein receiving a request to allocate or deallocate memory comprises receiving a call to a memory deallocation function "free".

7. The method of claim 1, wherein accessing in a memory leak table comprises mapping parameters associated with the call path to a table index.

8. The method of claim 1, wherein accessing in a memory leak table comprises retrieving stack pointers to function calls in the call path.

9. The method of claim 8, wherein accessing in a memory leak table comprises mapping the stack pointers to a table index.

10. The method of claim 1, wherein accessing in a memory leak table comprises performing a hash function on one or more parameters associated with the call path and accessing the entry based at least in part on the hash function result.

11. The method of claim 10, wherein the parameters include stack pointers to function calls in the call path.

12. The method of claim 11, wherein 16 stack pointers are included.

13. The method of claim 10, wherein the hash function is an XOR function.

14. The method of claim 10, further comprising taking a modulo of the hash result to produce a table index wherein the modulo base is the size of the memory leak table.

15. The method of claim 14, wherein the memory leak table is accessed based at least in part on the table index.

16. The method of claim 1, wherein accessing in a memory leak table includes determining whether the call path matches a call path associated with an existing entry.

17. The method of claim 1, wherein accessing in a memory leak table comprises creating the entry.

18. The method of claim 1, further comprising storing in the entry stack pointers to function calls in the call path.

19. The method of claim 18, wherein 16 stack pointers are stored.

20. The method of claim 1, wherein updating comprises incrementing or decrementing a count in the entry.

21. The method of claim 1, further comprising storing a pointer to the entry in a memory block allocated by the request if the request comprises a memory allocation request.

22. The method of claim 21, wherein the pointer is stored in otherwise unused header bytes of the memory block.

23. The method of claim 1, wherein accessing in a memory leak table comprises accessing a pointer in the header of the memory to be deallocated if the request comprises a memory deallocation request.

24. The method of claim 1, further comprising determining whether a flag that enables memory leak detection is set.

25. The method of claim 1, wherein a memory manager performs the method.

26. The method of claim 1, wherein updating comprises incrementing or decrementing a count in the entry and the method further comprises:
   determining a current value of the count; and
   in the event the count is greater than a prescribed threshold, concluding that a memory leak may be present.

27. The method of claim 26, wherein the prescribed threshold is zero.

28. A system for detecting a memory leak, comprising:
   a processor configured to:
      receive a request to allocate or deallocate memory;
      access in a memory leak table that is bounded in size an entry that is associated with a call path with which the request is associated;
      update the entry in the memory leak table; and
      access the entry and read a value stored in the entry; and
      determine if the value indicates that a memory leak may be present; and
   a memory that is coupled with the processor and configured to store the memory leak table.

29. A computer program product for detecting a memory leak, the computer program product being embodied in a computer readable storage medium and comprising computer instructions for:
   receiving a request to allocate or deallocate memory;
   accessing in a memory leak table that is bounded in size an entry that is associated with a call path with which the request is associated;
   updating the entry in the memory leak table;
   access the entry and read a value stored in the entry; and
   determine if the value indicates that a memory leak may be present.

30. The system of claim 28, wherein if the request is one to allocate memory, the call path with which the request is associated is the call path by which the request was generated.

31. The system of claim 28, wherein if the request is one to deallocate memory, the call path with which the request is associated is the call path by which the memory to be deallocated was allocated.

32. The system of claim 28, wherein the processor is configured to access in a memory leak table by mapping parameters associated with the call path to a table index.

33. The system of claim 28, wherein the processor is further configured to store in the entry stack pointers to function calls in the call path.

34. The computer program product of claim 29, wherein if the request is one to allocate memory, the call path with which the request is associated is the call path by which the request was generated.

35. The computer program product of claim 29, wherein if the request is one to deallocate memory, the call path with which the request is associated is the call path by which the memory to be deallocated was allocated.

36. The computer program product of claim 29, wherein accessing in a memory leak table comprises mapping parameters associated with the call path to a table index.

37. The computer program product of claim 29, the computer program product further comprising computer instructions for storing in the entry stack pointers to function calls in the call path.

* * * * *